No. 858,508. PATENTED JULY 2, 1907.
G. GOLDMAN.
DUSTING APPARATUS.
APPLICATION FILED SEPT. 22, 1904.
2 SHEETS—SHEET 1.
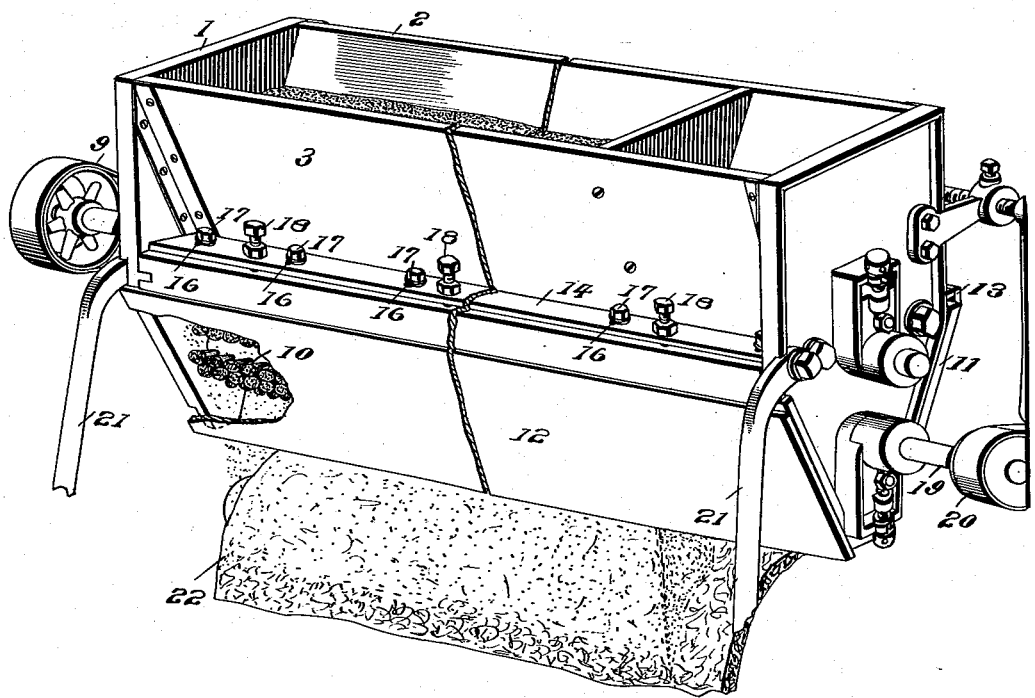
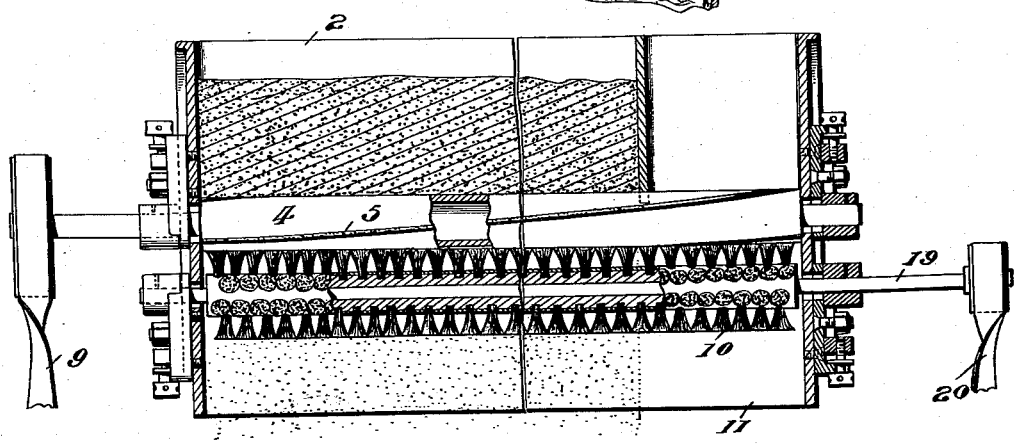

No. 858,508. PATENTED JULY 2, 1907.
G. GOLDMAN.
DUSTING APPARATUS.
APPLICATION FILED SEPT. 22, 1904.
2 SHEETS—SHEET 2.
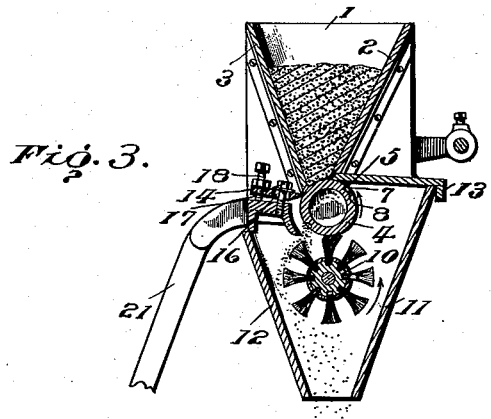
Fig. 3.
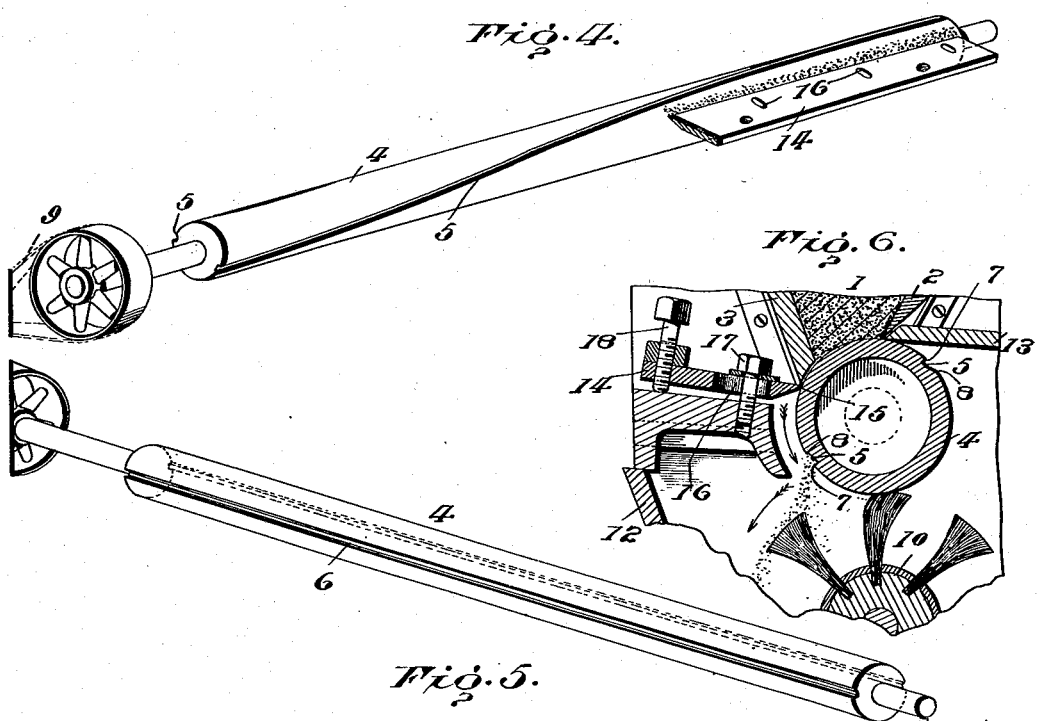
Fig. 4.
Fig. 6.
Fig. 5.

UNITED STATES PATENT OFFICE.

GUSTAV GOLDMAN, OF BALTIMORE, MARYLAND.

DUSTING APPARATUS.

No. 858,508.  Specification of Letters Patent.  Patented July 2, 1907.

Application filed September 22, 1904. Serial No. 225,538.

*To all whom it may concern:*

Be it known that I, GUSTAV GOLDMAN, of Baltimore, Maryland, have invented a new and useful Improvement in Dusting Apparatus, which invention is fully set forth in the following specification.

This invention relates to means for evenly distributing pulverulent material where the even distribution of such material may be desired.

In my U. S. Patent No. 758,243, April 26, 1904, I have described a process of matting or felting fibrous material, one of the steps of which consists in introducing finely divided material between the fibers, and for the purpose of illustration I have, in the present case, shown my machine for distributing pulverulent material as employed in the treatment of fibrous materials as set forth in said patent, though it may be used for any other purpose or in any other art where even distribution of such material is desired.

Various mechanical expressions may be given to the inventive idea involved, and, for the pupose of illustration, there is herein shown one form which the invention may assume, it being expressly understood, however, that the drawings shown are for the purpose of illustration rather than for the purpose of defining the limits of the invention, for which reference is had to the claims.

In said drawings, Figure 1 is a perspective view of my distributing apparatus; Fig. 2 is a central longitudinal section thereof, parts being shown in elevation; Fig. 3 is a transverse section of the apparatus; and Fig. 4 is a perspective view of the roller for receiving the pulverulent material from the hopper, the scraper blade being shown in broken detail; Fig. 5 is a perspective view of another form of said material-carrying roller; and Fig. 6 is a transverse broken section to more clearly illustrate the operation of the device.

Referring to the drawings, 1 is a hopper open at the bottom and having sides 2—3 which slope downward and inward, leaving an opening or mouth at the bottom of such sides, as clearly shown in Figs. 3 and 6. This opening extends throughout the length of the hopper and immediately beneath the same, and placed in close juxtaposition therewith is a longitudinal distributing roller 4, which roller forms the bottom of the hopper.
Preferably one of the sides of the hopper, as for example the side 2, meets or comes into contact with the roller 4 above its longitudinal center, while the opposite side 3 comes into contact with the roller somewhat below the top of the longitudinal center of the roller, as will be clearly understood from an inspection of Figs. 3 and 6. The roller 4 is provided with a plurality of depressions below its surface, here shown as in the form of two grooves 5, cut into the surface of the roller. These grooves may extend either spirally around the roller, as shown in Fig. 4, or may extend in a straight line along the roller, as shown at 6 in Fig. 5. Preferably the walls of the groove are formed at different angles. For example, one of the walls of the groove is formed substantially on a radial line of the roller, as shown at 7, Fig. 6, while the other slopes gradually outward from the bottom of the wall 7 and runs smoothly into the periphery of the roller as shown at 8 in Fig. 6. Instead of grooves any other suitable form of depression may be formed in the surface of the roller. The arrangement of the roller and the hopper is such that none of the pulverulent material should escape between the walls of the hopper and the surface of the roller, but when the roller is revolved, as by the application of power through a belt 9, Fig. 4, the pulverulent material in the hopper falls into the depressed groove 5 or 6, as the case may be, and by the revolution of the roller it is carried out of the hopper, and as the roller continues to revolve the material falls by gravity out of the groove. If desired the material may be allowed to descend from the groove directly upon the surface of the material where it is to be applied, but for the purpose of more effectively distributing the material a revolving brush 10 is located immediately beneath the roller and in such position that the same will act to clean the surface of the roller from any pulverulent material that may have clung thereto, and also to brush out of the groove any of the material which might be inclined to adhere thereto and which would not readily fall therefrom under the action of gravity. For the purpose of directing the material as it leaves the roller onto any particular portion of the surface or material to which it is to be applied, the roller 4 and brush 10 are preferably inclosed in a boxing having slanting side walls 11 and 12 inclined downward and inward toward each other. This boxing is provided with a suitable top 13 which fits closely upon the top of the roller close to the bottom of the wall 2 of the hopper, and on the other side of the machine adjacent to the wall 3 of the hopper there is adjustably mounted a scraper blade 14, having a beveled edge 15, which rests in intimate contact with the face of the distributing roller 4. While the roller 4 forms substantially the bottom of the hopper containing the mass of pulverulent material to be distributed, preferably the wall 3 of the scraper does not rest in intimate contact therewith, and more of less of the pulverulent material would be liable to escape during the operation of the device, at the point of junction between the wall 3 of the hopper and the roller and the scraping blade 14 is designed to arrest all such material and prevent its escape, to the end that only that material actually occupying the groove 5 in the distributing roller shall be carried forward and distributed. This enables the exact amount of the material to be delivered by the distributing device to be accurately gaged, since the amount which will be retained by the grooves is a fixed quantity and it is therefore only necessary to adjust the number of revolutions of the roller per minute in order to determine accurately the amount of material that will be distributed thereby in a given time. In order to compensate for wear and to enable the scraper blade 14 to always rest in exact contact with the roller without bearing too hard thereon, there is provided slots 16, Figs. 4 and 6, through which screw bolts 17 pass and engage corresponding screw threads in the frame of the machine, as shown in Figs. 3 and 6.

For the purpose of adjusting the angle at which the edge of the blade shall contact with the distributing roller, screws 18 are passed through the outer edge of the scraper blade 14 and bear upon the framework of the machine, so that by adjusting said screws the outer edge of the scraper blade may be raised or lowered, as may be desired, and its position accurately adjusted.

For the purpose of revolving the distributing brush 10, the same is mounted on a shaft 19, Figs. 1 and 2, which shaft is driven from any suitable source of power, as by a belt 20 passing over a pulley secured to said shaft. The entire apparatus may be suitably mounted upon any framework or attached to parts of any other machine, bracket arms 21—21, being here shown as the means for supporting the dust-box, though it will be understood that any other supporting means may be employed, if desired.

In the operation of the machine the pulverulent material having been placed in the hopper, and the scraper blade 14 being adjusted so as to come into intimate contact with the exterior surface of the roller 4, the said roller and the brush 10 are set in revolution, preferably in the same direction, the direction of revolution of the brush and roller being indicated by arrows in Figs. 3 and 6. An inspection of the latter figure will disclose the fact that no pulverulent material can leave the hopper except that which is carried by the grooves 5 in the distributing roller, and the gradual slope of the rear wall of said groove effectually prevents any engagement of the scraper blade 14 with said groove. It is for the purpose of further preventing any engagement of the blade with the wall of the groove that it is preferred to construct this groove in the form of a spiral extending around the roller, as shown in Fig. 4, so that the scraper blade will always lie entirely across the groove. This would not occur if the groove were in a straight line, and the careless adjustment of the blade when it was opposite the roller might result in the advancement of the scraper blade into the groove so as to break or injure the machinery when in operation.

As shown in Fig. 1, 22 is a sheet or mass of loose fibrous material between the fibers of which it is desired to distribute the pulverulent material to act as a binder. It will be understood that the material 22 is slowly advanced under the dusting device, and that as it does so the pulverulent material descends through the dusting box onto the fibrous sheet, all of which will be clearly apparent upon an inspection of Figs. 1 and 3.

By the means described, the pulverulent material may be evenly distributed over any desired surface, and the amount of material which is distributed may be determined with great accuracy merely by timing the revolutions of the distributing roller 4 and the advancement of the surface 22 upon which the pulverulent material falls.

The device is of great simplicity of construction and hence little liable to get out of order, can be built at minimum cost and is thorough and efficient in operation.

What is claimed is:

1. In an apparatus of the character described, a hopper or receptacle for pulverulent material, a roller forming the bottom of said hopper and having a spirally extending groove formed on its periphery, and means for revolving said roller.

2. In an apparatus of the character described, a distributing roller having a spiral groove formed on its surface and a scraper bar or blade extending longitudinally of the roller and substantially parallel with the axis thereof.

3. In an apparatus of the character described, a receptacle for pulverulent material, a distributing roller forming the bottom of said receptacle and having a spirally arranged groove on its exterior surface, a scraper bar extending longitudinally of said roller and substantially parallel of its axis, and a distributing brush mounted in contact with said roller.

4. In an apparatus of the character described, a hopper or receptacle for pulverulent material, a roller forming the bottom of said hopper and having material-receiving grooves formed in its surface, a scraper bar or plate extending across said grooves, and means for revolving the roller.

5. In an apparatus of the character described, a hopper, a revoluble roller closing the bottom of said hopper, said roller being provided with a longitudinal groove having its forward wall radially disposed and its rearward wall transverse to its forward wall, and a scraper bar in near proximity to said roller.

6. In an apparatus of the character described, a hopper, a revoluble roller closing the bottom of said hopper, said roller being provided with a longitudinal spiral groove having its forward wall radially disposed and its rearward wall transverse to its forward wall, and a scraper bar in near proximity to said roller.

In testimony whereof I have signed this specification in the presence of two subscribing witnesses.

GUSTAV GOLDMAN.

Witnesses:
G. T. CAMERON,
REEVE LEWIS.